(12) United States Patent
Fu (10) Patent No.: US 9,387,622 B2
(45) Date of Patent: Jul. 12, 2016

(54) HOT PRESSING APPARATUS (71) Applicant: Wistron Corporation, New Taipei (TW)

(72) Inventor: Dong-Dong Fu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 624 days.

(21) Appl. No.: 13/894,446

(22) Filed: May 15, 2013

(65) Prior Publication Data

US 2014/0290869 A1     Oct. 2, 2014

(30) Foreign Application Priority Data

Apr. 1, 2013   (CN) .......................... 2013 1 0111525

(51) Int. Cl.
*B32B 37/00*     (2006.01)
*B29C 65/44*     (2006.01)
(Continued)

(52) U.S. Cl.
CPC ................ *B29C 65/44* (2013.01); *B29C 65/18* (2013.01); *B29C 65/7802* (2013.01); *B29C 65/7841* (2013.01); *B29C 66/005* (2013.01); *B29C 66/5346* (2013.01); *B29C 66/742* (2013.01); *B29C 66/8322* (2013.01); *B29C 66/8412* (2013.01); *B29C 66/006* (2013.01);
(Continued)

(58) Field of Classification Search
CPC .... B29C 65/44; B29C 65/18; B29C 65/7802; B29C 65/7841; B29C 66/005; B29C 66/5346; B29C 66/742; B29C 66/8322; B29C 66/8412
USPC ....................... 156/580, 581, 583.1
See application file for complete search history.

(56) References Cited

U.S. PATENT DOCUMENTS 5,851,459 A    12/1998   Chen
6,310,612 B1   10/2001   Kotsubo
(Continued)

FOREIGN PATENT DOCUMENTS

CN    102189685 A    9/2011
CN    102463645 A    5/2012
(Continued)

OTHER PUBLICATIONS

Office action mailed on Dec. 3, 2015 for the China application No. 201310111525.8, p. 3 line 4~44 and p. 4.

(Continued)

*Primary Examiner* — James Sells
(74) *Attorney, Agent, or Firm* — Winston Hsu; Scott Margo (57) ABSTRACT

A hot pressing apparatus includes a positioning template having a forming region for placing a workpiece, a hot pressing template, a plurality of positioning blocks, and a lifting mechanism. A plurality of holes is formed in the forming region along a periphery of the forming region. The positioning blocks are movably disposed outside the forming region along the periphery of the forming region for positioning the workpiece in the forming region. The hot pressing template is movable between a hot pressing position and a releasing position for hot pressing the workpiece located in the forming region cooperatively with the positioning template when moving to the hot pressing position. The lifting mechanism includes a plurality of pillars movably disposed in the holes respectively and a driving device for driving each pillar to extend out from the corresponding hole so as to lift the workpiece.

18 Claims, 6 Drawing Sheets

(51) Int. Cl.
*B29C 65/18* (2006.01)
*B29C 65/78* (2006.01)
*B29C 65/00* (2006.01)
*B29L 12/00* (2006.01)

(52) U.S. Cl.
CPC ....... *B29C66/7422* (2013.01); *B29C 2791/002* (2013.01); *B29L 2012/00* (2013.01)

(56) References Cited

U.S. PATENT DOCUMENTS 7,056,405 B2* 6/2006 Worden ............. B29C 66/8167
  156/228
8,206,525 B2* 6/2012 Izumi .................. H01L 21/2007
  156/228
8,540,000 B2* 9/2013 Okazaki .................. H01L 31/18
  156/358

FOREIGN PATENT DOCUMENTS

TW 315345 9/1997
TW I338616 3/2011

OTHER PUBLICATIONS

Office action mailed on Dec. 14, 2015 for the Taiwan application No. 102113978, filing date: Apr. 19, 2013, p. 1 line 12~14, p. 2~5 and p. 6 line 1~15.

* cited by examiner

HOT PRESSING APPARATUS

BACKGROUND OF THE INVENTION

1. Field of the Invention

The present invention relates to a hot pressing apparatus, and more specifically, to a hot pressing apparatus of utilizing a lift mechanism to lift a workpiece.

2. Description of the Prior Art

In general, a plastic frame is usually connected to a metal sheet (e.g. an aluminum sheet) by a hot pressing process. The conventional hot pressing process is to place the plastic frame and the metal sheet on a positioning template located under a hot pressing template, and then to appropriately adjust positions of positioning blocks on the positioning template to position the plastic frame and the metal sheet placed on the positioning template. After the hot pressing template moves downward to hot press the plastic frame and the metal sheet cooperatively with the positioning template, the hot pressing process for connecting the plastic frame to the metal sheet is accordingly completed.

After the metal sheet is connected to the plastic frame by the aforesaid hot pressing process, an operator usually pulls at least one corner of the workpiece to remove the workpiece from the positioning template. However, since the plastic frame may abut against the positioning blocks more tightly due to thermal deformation of the plastic frame occurring during the hot pressing process, it is difficult for the operator to remove the workpiece from the positioning template. Furthermore, the aforesaid corner pulling method may also cause warping deformation or damage of the workpiece due to an excessive force applied by the operator, so as to greatly influence the forming quality of the workpiece.

SUMMARY OF THE INVENTION

An objective of the present invention is to provide a hot pressing apparatus of utilizing a lift mechanism to lift a workpiece to solve the aforesaid problem.

The present invention provides a hot pressing apparatus for performing a hot pressing process on a workpiece. The hot pressing apparatus includes a positioning template, a plurality of positioning blocks, a hot pressing template, and a lifting mechanism. The positioning template has a forming region for placing the workpiece. A plurality of holes is formed in the forming region along a periphery of the forming region. The plurality of positioning blocks is movably disposed outside the forming region along the periphery of the forming region for positioning the workpiece in the forming region. The hot pressing template is movably disposed between a hot pressing position and a releasing position for hot pressing the workpiece located in the forming region cooperatively with the positioning template when moving to the hot pressing position. The lifting mechanism includes a plurality of pillars and a driving device. The plurality of pillars is movably disposed in the plurality of holes respectively. The driving device is used for driving each pillar to extend out from the corresponding hole so as to lift the workpiece when the hot pressing template moves to the releasing position.

According to the claimed invention, the plurality of holes is formed in the forming region corresponding to the plurality of positioning blocks.

According to the claimed invention, the workpiece includes a plastic frame and a metal sheet. The hot pressing template hot presses the plastic frame and the metal sheet located in the forming region cooperatively with the positioning template to connect the metal sheet to the plastic frame when the hot pressing template moves to the hot pressing position. The driving device drives each pillar to extend out from the corresponding hole to lift the plastic frame with the metal sheet when the hot pressing template moves to the releasing position.

According to the claimed invention, the hot pressing apparatus further includes a template support structure disposed under the positioning template for supporting the positioning template.

According to the claimed invention, the driving device includes a gas providing pipeline and a switch. The gas providing pipeline is disposed through the template support structure and communicated with the plurality of holes for providing gas into the plurality of holes so as to pneumatically drive each pillar to extend out from the corresponding hole. The switch is disposed on the gas providing pipeline for turning on or turning off the gas providing pipeline.

According to the claimed invention, the template support structure includes a template base and an apparatus stand. The template base is disposed under the positioning template. The gas providing pipeline is disposed through the template base. The apparatus stand is disposed under the template base for supporting the template base.

According to the claimed invention, the driving device drives each pillar to extend out from the corresponding hole by mechanical power or hydraulic pressure.

According to the claimed invention, at least one of the plurality of holes is formed at a position corresponding to at least one corner of the forming region.

According to the claimed invention, the hot pressing apparatus further includes a linkage rod connected to the hot pressing template for controlling the hot pressing template to move to the hot pressing position or the releasing position relative to the positioning template.

According to the claimed invention, the metal sheet is made of aluminum material.

According to the claimed invention, each pillar is made of soft material with a low density.

According to the claimed invention, each pillar is made of aluminum material.

Compared with the prior art, the present invention utilizes the lifting mechanism to lift the workpiece instead of pulling one corner of the workpiece manually, so as to achieve the purpose that the operator could operate the lifting mechanism to lift the workpiece and then remove the workpiece from the hot pressing apparatus easily after the hot pressing process of the workpiece is completed. In such a manner, via the design of utilizing the driving device to drive the pillars to lift the workpiece, the hot pressing apparatus of the present invention allows that the operator could directly remove the workpiece from the hot pressing apparatus without pulling one corner of the workpiece, so as to efficiently solve the prior art problem that the workpiece could not be removed from the hot pressing apparatus easily and prevent warping deformation or damage of the workpiece due to excessive force applied by the operator. Accordingly, the forming quality and process efficiency of the workpiece could be improved greatly.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
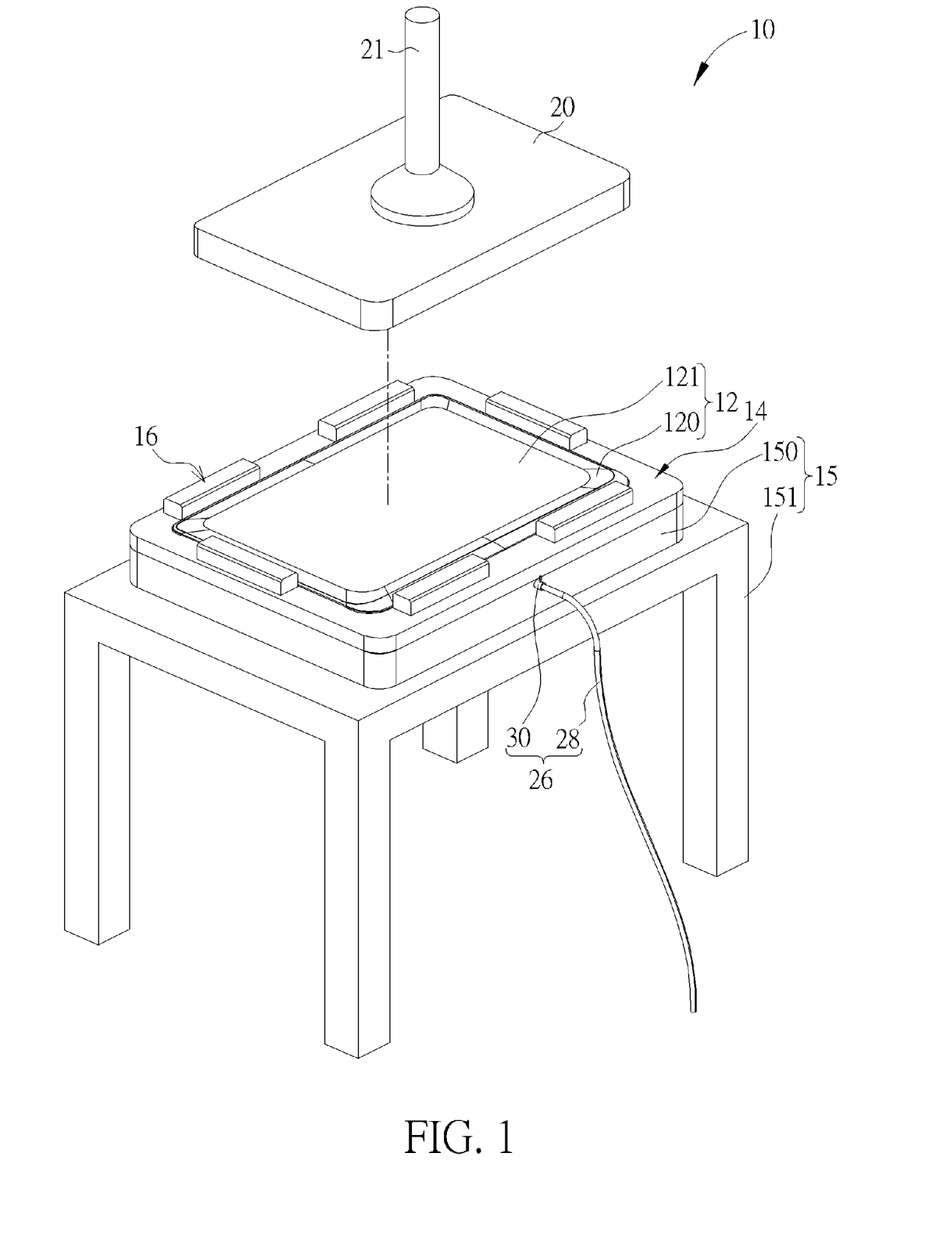
FIG. 1 is a diagram of a hot pressing apparatus according to an embodiment of the present invention.

Please refer to FIG. 1, which is a diagram of a hot pressing apparatus 10 according to an embodiment of the present invention. The hot pressing apparatus 10 is used for hot pressing a work piece 12. In this embodiment, the workpiece 12 includes a plastic frame 120 and a metal sheet 121 and the metal sheet 121 could be made of aluminum material. That is, the hot pressing apparatus 10 could be used for performing a hot pressing process on a plastic frame and an aluminum sheet, but not limited thereto, meaning that all hot pressing apparatuses capable of utilizing positioning blocks to position a workpiece and then hot pressing the workpiece could be adopted by the present invention.

Figure 2:
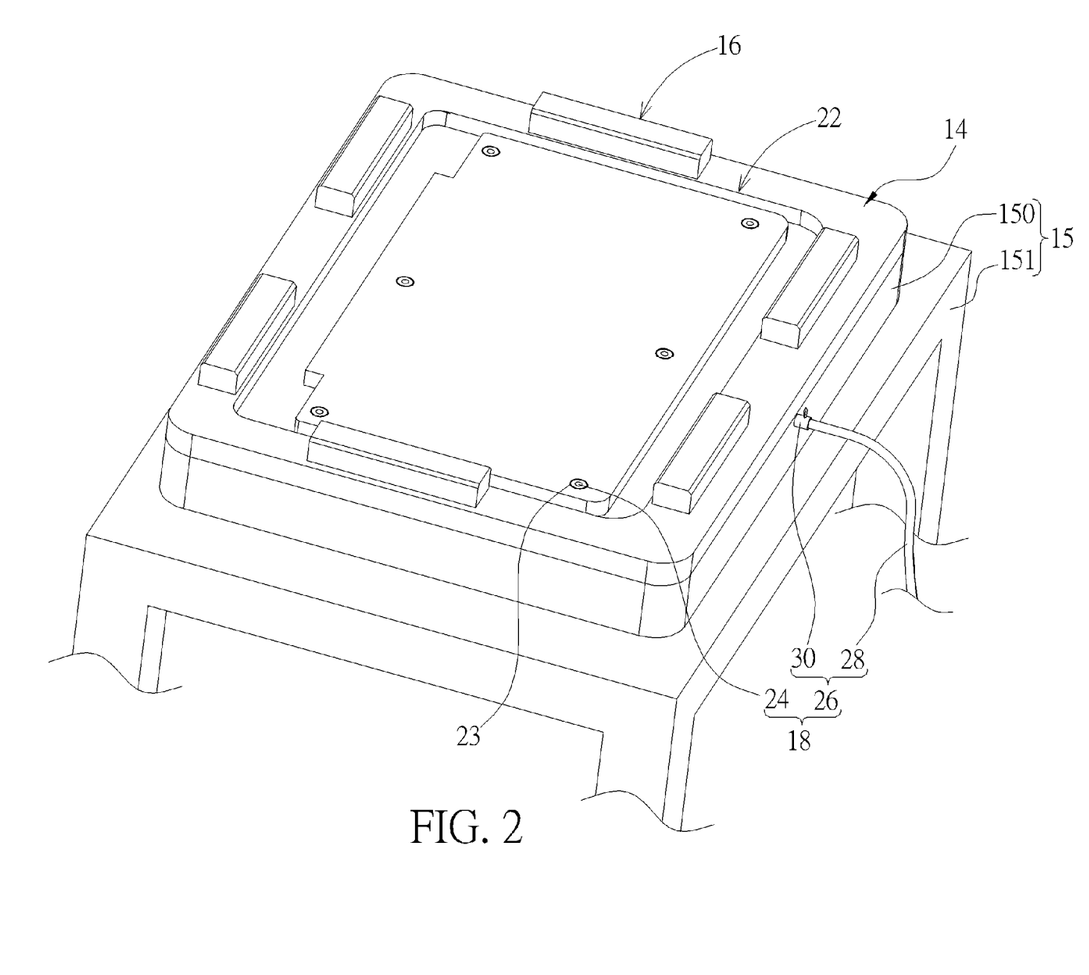
FIG. 2 is an enlarged diagram of a positioning template, a template support structure, a plurality of positioning blocks, and a lifting mechanism in FIG. 1.

Please refer to FIG. 2, which is an enlarged diagram of a positioning template 14, a template support structure 15, a plurality of positioning blocks 16, and a lifting mechanism 18 in FIG. 1. As shown in FIG. 1 and FIG. 2, the hot pressing apparatus 10 includes the positioning template 14, the plurality of positioning blocks 16, the lifting mechanism 18, and a hot pressing template 20. The positioning template 14 has a forming region 22 for placing the workpiece 12. The plurality of holes 23 is formed in the forming region 22 along a periphery of the forming region 22. In this embodiment, as shown in FIG. 2, the plurality of holes 23 could be formed at four corners and two long sides of the forming region 22. The plurality of positioning blocks 16 could be movably disposed outside the forming region 22 along the periphery of the forming region 22. In such a manner, an operator could adjust each positioning block 16 appropriately to abut against the workpiece 12 tightly according to the size of the workpiece 12, so that the workpiece 12 could be steadily positioned in the forming region 22 for preventing the workpiece 12 from sliding when the hot pressing apparatus 10 performs a hot pressing process on the workpiece 12. The hot pressing template 20 could be movable upward and downward relative to the positioning template 14. To be more specific, in this embodiment, the hot pressing apparatus 10 could further include a linkage rod 21. The linkage rod 21 is connected to the hot pressing template 20 for controlling the hot pressing template 20 to move upward and downward relative to the positioning template 14. As for description for the related linkage design, it is commonly seen in the prior art and therefore omitted herein. The hot pressing template 20 could be used for hot pressing the workpiece 12 located in the forming region 22 cooperatively with the positioning template 14 when moving to a hot pressing position, so as to connect the plastic frame 120 to the metal sheet 121.

Furthermore, the hot pressing apparatus 10 could further include a template support structure 15. The template support structure 15 is disposed under the positioning template 14. The template support structure 15 could adopt a template support design commonly applied to a hot pressing process. For example, the template support structure 15 could include a template base 150 and an apparatus stand 151. The template base 150 could be disposed under the positioning template 14 and the apparatus stand 151 could be disposed under the template base 150, so as to cooperatively form a support platform to support the positioning template 14 steadily.

As shown in FIG. 2, the lifting mechanism 18 includes a plurality of pillars 24 and a driving device 26. The plurality of pillars 24 could be movably disposed in the plurality of holes 23 respectively. The driving device 26 is used for driving each pillar 24 to extend out from the corresponding hole 23 to lift the workpiece 12. The plurality of pillars 24 could be made of soft material with a low density (e.g. aluminum material), so as to prevent the workpiece 12 from being scratched or damaged by the plurality of pillars 24. The driving device 26 could preferably adopt a pneumatic driving mechanism to drive each pillar 24. For example, the driving device 26 could include a gas providing pipeline 28 and a switch 30. The gas providing pipeline 28 could be preferably disposed through the template base 150 and communicated with the plurality of holes 23 in the positioning template 14. The gas providing pipeline 28 is used for providing gas into the plurality of holes 23 to pneumatically drive each pillar 24 to extend out from the corresponding hole 23. The gas provided by the gas providing pipeline 28 could be industrial gas commonly applied to a conventional pneumatic driving mechanism, such as compressed air or nitrogen gas. The switch 30 is disposed on the gas providing pipeline 28 for turning on or turning off the gas providing pipeline 28 to control each pillar 24 to move upward or downward.

Figure 3:
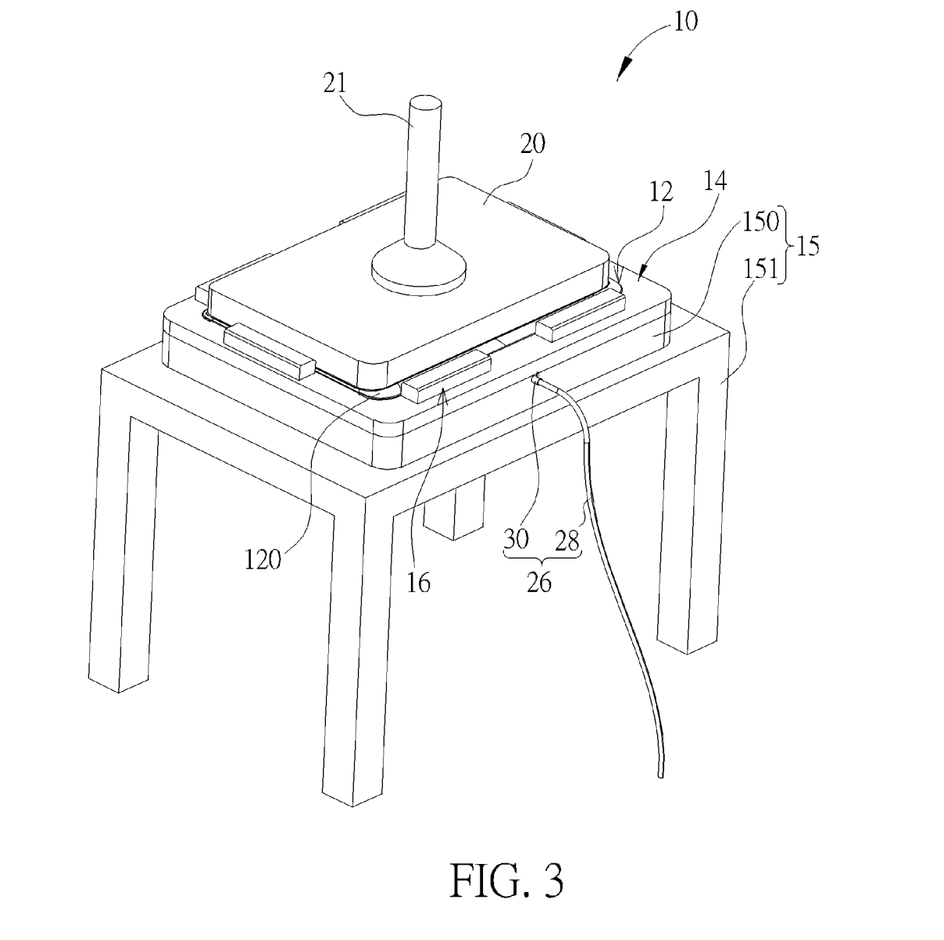
FIG. 3 is a diagram of the hot pressing template and the positioning template in FIG. 1 hot pressing a workpiece.
Figure 4:
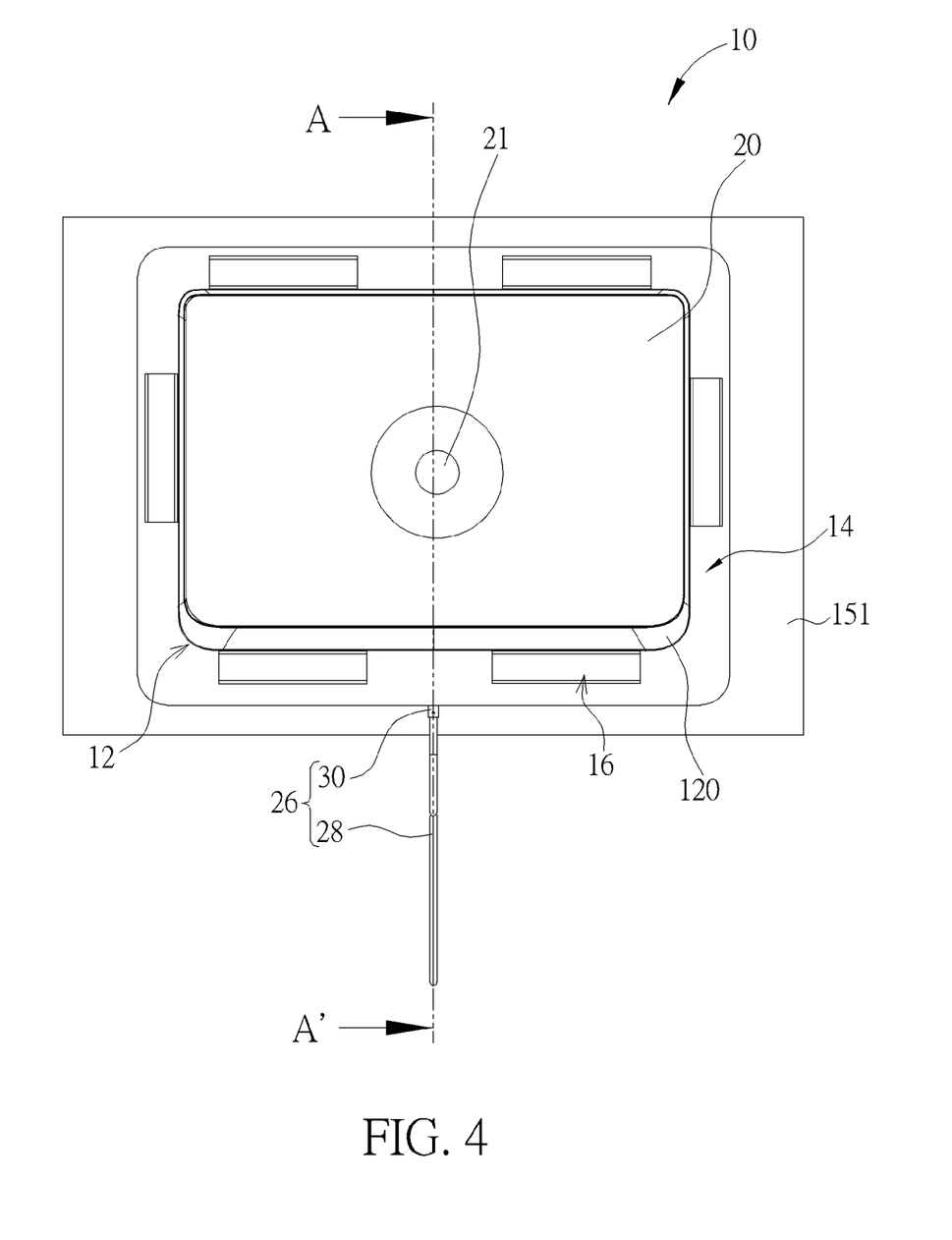
FIG. 4 is a top view of the hot pressing apparatus in FIG. 3.
Figure 5:
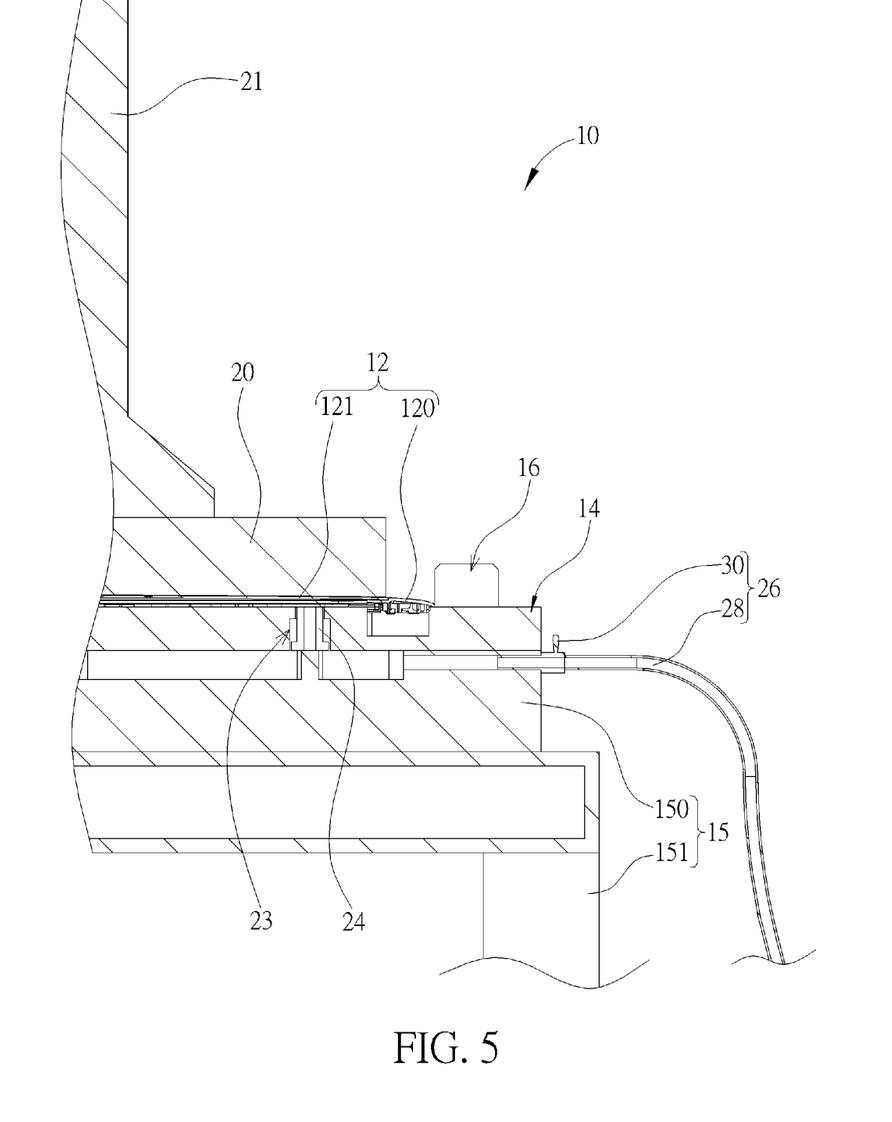
FIG. 5 is a partial sectional diagram of the hot pressing apparatus in FIG. 4 along a sectional line A-A'.
Figure 6:
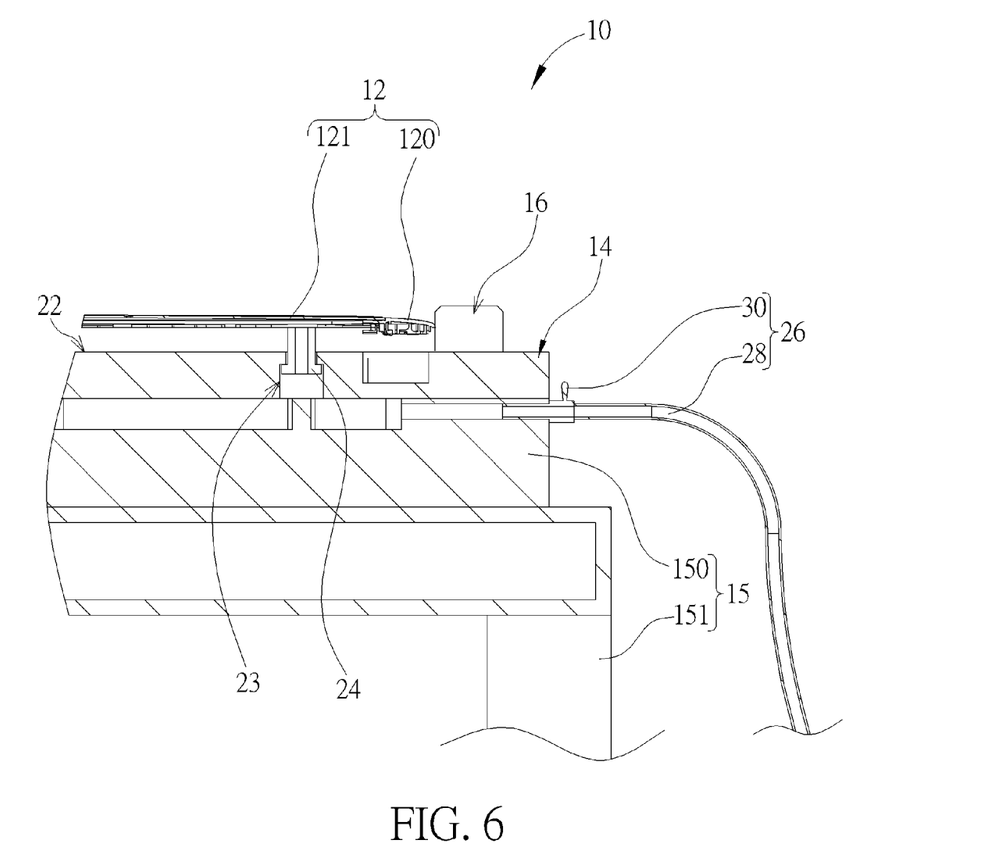
FIG. 6 is a partial sectional diagram of a pillar in FIG. 5 extending out from a hole to lift the workpiece.

More detailed description for the workpiece lifting operation of the hot pressing apparatus 10 is provided as follows. Please refer to FIG. 1, FIG. 3, FIG. 4, FIG. 5, and FIG. 6. FIG. 3 is a diagram of the hot pressing template 20 and the positioning template 14 in FIG. 1 hot pressing the workpiece 12. FIG. 4 is a top view of the hot pressing apparatus 10 in FIG. 3. FIG. 5 is a partial sectional diagram of the hot pressing apparatus 10 in FIG. 4 along a sectional line A-A'. FIG. 6 is a partial sectional diagram of the pillar 24 in FIG. 5 extending out from the hole 23 to lift the workpiece 12. First, an operator could place the plastic frame 120 in the forming region 22 as shown in FIG. 2 and then place the metal sheet 121 in the plastic frame 120 (as shown in FIG. 1). Subsequently, the operator could adjust the relative position of each positioning block 16 appropriately according to the size of the plastic frame 120 to make each positioning block 16 abut against the plastic frame 120 tightly, so as to prevent the plastic frame 120 and the metal sheet 121 from sliding during the hot pressing apparatus 10 performs a hot pressing process on the plastic frame 120 and the metal sheet 121 (as shown in FIG. 1 and FIG. 4). Subsequently, the operator could operate the linkage rod 21 to control the hot pressing template 20 to move from a releasing position as shown in FIG. 1 to a hot pressing position as shown in FIG. 3, so that the hot pressing template 20 could hot press the plastic frame 120 and the metal sheet 121 located in the forming region 22 cooperatively with the positioning template 14. At this time, the position relationship between the pillar 24 and the workpiece 12 is as shown in FIG. 5.

After completing the aforesaid hot press process to connect the metal sheet 121 to the plastic frame 120, the operator could operate the linkage rod 21 again to control the hot pressing template 20 to move from the hot pressing position as shown in FIG. 3 to the releasing position as shown in FIG. 1. Subsequently, the operator could control the switch 30 to turn on the gas providing pipeline 28, so that the gas providing pipeline 28 could provide gas into the hole 23. Accordingly, the pillar 24 could be pneumatically driven by gas entering the hole 23 to move from a position as shown in FIG. 5 to a position as shown in FIG. 6 so as to extend out from the hole 23. During the aforesaid process, as shown in FIG. 5 and FIG. 6, the pillar 24 could contact with the plastic frame 120 and then lift the plastic frame 120 with the metal sheet 121 upward to the position as shown in FIG. 6 by the driving force provided by gas of the gas providing pipeline 28. To be noted, the present invention could also adopt the design that the workpiece 12 is directly lifted to a position where the workpiece 12 is separate from the positioning block 16 or other position where the operator could conveniently remove the workpiece 12 from the positioning template 14. Finally, after the workpiece 12 is removed from the positioning template 14, the operator could control the switch 30 to turn off the gas providing pipeline 28. At this time, since the pillar 24 is no more lifted by the driving force provided by gas of the gas providing pipeline 28, the pillar 24 could automatically move downward to retract back into the hole 23 due to gravity so that the operator could continue to perform the next hot pressing process.

It should be mentioned that the forming positions of the plurality of holes 23 are not limited to the positions corresponding to the four corners and the two long sides of the forming region 22 as shown in FIG. 2. In other words, all designs of forming holes in the forming region along the periphery of the forming region so as to make each pillars capable of extend out from the corresponding hole to lift the workpiece could be adopted by the present invention. For example, in another embodiment, the plurality of holes 23 could be formed in the forming region 22 corresponding to the plurality of positioning blocks 16. As for which design is utilized, it depends on the practical process needs of the hot pressing apparatus 10. Furthermore, besides the pneumatic driving mechanism mentioned in the aforesaid embodiment, the driving device 26 could also utilize other conventional driving mechanism. For example, in another embodiment, the driving device 26 could utilize a mechanical driving mechanism (e.g. a gear driving mechanism) or a hydraulic driving mechanism to drive each pillar 24 to extend out from the corresponding hole 23. As for description for the related driving principles and designs, it is commonly seen in the prior art and therefore omitted herein.

Compared with the prior art, the present invention utilizes the lifting mechanism to lift the workpiece instead of pulling one corner of the workpiece manually, so as to achieve the purpose that the operator could operate the lifting mechanism to lift the workpiece and then remove the workpiece from the hot pressing apparatus easily after the hot pressing process of the workpiece is completed. In such a manner, via the design of utilizing the driving device to drive the pillars to lift the workpiece, the hot pressing apparatus of the present invention allows that the operator could directly remove the workpiece from the hot pressing apparatus without pulling one corner of the workpiece, so as to efficiently solve the prior art problem that the workpiece could not be removed from the hot pressing apparatus easily and prevent warping deformation or damage of the workpiece due to excessive force applied by the operator. Accordingly, the forming quality and process efficiency of the workpiece could be improved greatly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hot pressing apparatus for performing a hot pressing process on a workpiece, the hot pressing apparatus comprising:
    a positioning template having a forming region for placing the workpiece, a plurality of holes being formed in the forming region along a periphery of the forming region;
    a plurality of positioning blocks movably disposed outside the forming region along the periphery of the forming region for positioning the workpiece in the forming region;
    a hot pressing template movably disposed between a hot pressing position and a releasing position for hot pressing the workpiece located in the forming region cooperatively with the positioning template when moving to the hot pressing position; and
    a lifting mechanism comprising:
        a plurality of pillars movably disposed in the plurality of holes respectively; and
        a driving device for driving each pillar to extend out from the corresponding hole so as to lift the workpiece when the hot pressing template moves to the releasing position, each pillar moving downward to retract back into the corresponding hole due to gravity when the driving device is turned off.

2. The hot pressing apparatus of claim 1, wherein the plurality of holes is formed in the forming region corresponding to the plurality of positioning blocks.

3. The hot pressing apparatus of claim 2, wherein the workpiece comprises a plastic frame and a metal sheet, the hot pressing template hot presses the plastic frame and the metal sheet located in the forming region cooperatively with the positioning template to connect the metal sheet to the plastic frame when the hot pressing template moves to the hot pressing position, and the driving device drives each pillar to extend out from the corresponding hole to lift the plastic frame with the metal sheet when the hot pressing template moves to the releasing position.

4. The hot pressing apparatus of claim 2 further comprising:
    a template support structure disposed under the positioning template for supporting the positioning template.

5. The hot pressing apparatus of claim 4, wherein the driving device comprises:
    a gas providing pipeline disposed through the template support structure and communicated with the plurality of holes for providing gas into the plurality of holes so as to pneumatically drive each pillar to extend out from the corresponding hole; and
    a switch disposed on the gas providing pipeline for turning on or turning off the gas providing pipeline.

6. The hot pressing apparatus of claim 5, wherein the template support structure comprises:
    a template base disposed under the positioning template, the gas providing pipeline being disposed through the template base; and
    an apparatus stand disposed under the template base for supporting the template base.

7. The hot pressing apparatus of claim 2, wherein the driving device drives each pillar to extend out from the corresponding hole by mechanical power or hydraulic pressure.

8. The hot pressing apparatus of claim 1, wherein at least one of the plurality of holes is formed at a position corresponding to at least one corner of the forming region.

9. The hot pressing apparatus of claim 8, wherein the workpiece comprises a plastic frame and a metal sheet, the hot pressing template hot presses the plastic frame and the metal sheet located in the forming region cooperatively with the positioning template to connect the metal sheet to the plastic frame when the hot pressing template moves to the hot pressing position, and the driving device drives each pillar to extend out from the corresponding hole to lift the plastic frame with the metal sheet when the hot pressing template moves to the releasing position.

10. The hot pressing apparatus of claim 8, wherein at least one of the plurality of holes is formed in the forming region corresponding to at least long side of the forming region.

11. The hot pressing apparatus of claim 8 further comprising:
 a template support structure disposed under the positioning template for supporting the positioning template.

12. The hot pressing apparatus of claim 11, wherein the driving device comprises:
 a gas providing pipeline disposed through the template support structure and communicated with the plurality of holes for providing gas into the plurality of holes so as to pneumatically drive each pillar to extend out from the corresponding hole; and
 a switch disposed on the gas providing pipeline for turning on or turning off the gas providing pipeline.

13. The hot pressing apparatus of claim 12, wherein the template support structure comprises:
 a template base disposed under the positioning template, the gas providing pipeline being disposed through the template base; and
 an apparatus stand disposed under the template base for supporting the template base.

14. The hot pressing apparatus of claim 8, wherein the driving device drives each pillar to extend out from the corresponding hole by mechanical power or hydraulic pressure.

15. The hot pressing apparatus of claim 1 further comprising:
 a linkage rod connected to the hot pressing template for controlling the hot pressing template to move to the hot pressing position or the releasing position relative to the positioning template.

16. The hot pressing apparatus of claim 1, wherein the metal sheet is made of aluminum material.

17. The hot pressing apparatus of claim 1, wherein each pillar is made of soft material with a low density.

18. The hot pressing apparatus of claim 17, wherein each pillar is made of aluminum material.

* * * * *